United States Patent
Puranen

(10) Patent No.: US 6,412,529 B1
(45) Date of Patent: Jul. 2, 2002

(54) METHOD FOR DETERMINING THE POINT TO START ROUNDING IN THE TURNING OF VENEER

(75) Inventor: Jussi Puranen, Lahti (FI)

(73) Assignee: Raute OYJ, Nastola (FI)

(*) Notice: Subject to any disclaimer, the term of this patent is extended or adjusted under 35 U.S.C. 154(b) by 4 days.

(21) Appl. No.: 09/620,570

(22) Filed: Jul. 20, 2000

(30) Foreign Application Priority Data

Jul. 20, 1999 (FI) .................................................. 991626

(51) Int. Cl.[7] ................................ B27B 1/00; B27L 5/02
(52) U.S. Cl. ...................... 144/356; 144/209.1; 144/365
(58) Field of Search ............................. 144/209.1, 211, 144/212, 356, 357, 365

(56) References Cited

U.S. PATENT DOCUMENTS

| | | | |
|---|---|---|---|
| 4,791,970 A | * 12/1988 | Walser et al. | 144/365 |
| 5,143,129 A | * 9/1992 | Toivio | 144/365 |
| 5,490,548 A | * 2/1996 | Puranen | 144/356 |
| 5,927,360 A | * 7/1999 | Nakamura et al. | 144/357 X |
| 5,967,208 A | * 10/1999 | Calvert | 144/356 |
| 6,116,306 A | * 9/2000 | Ely | 144/357 X |

* cited by examiner

Primary Examiner—W. Donald Bray
(74) Attorney, Agent, or Firm—Connolly Bove Lodge & Hutz LLP

(57) ABSTRACT

The present invention relates to a method for determining the starting point of rounding turning in the turning of veneer. For turning a log, the knife carriage of the lathe is withdrawn into a home position before starting the turning of a new log and, during the initial phase of turning, the knife carriage is driven from the home position forward into the starting position of rounding turning at a fast rate. During the initial turning phase, the intensity of knife carriage vibration is monitored and the thus obtained intensity value of knife carriage vibration is used in the determination of the initial position of the log rounding phase.

6 Claims, 1 Drawing Sheet

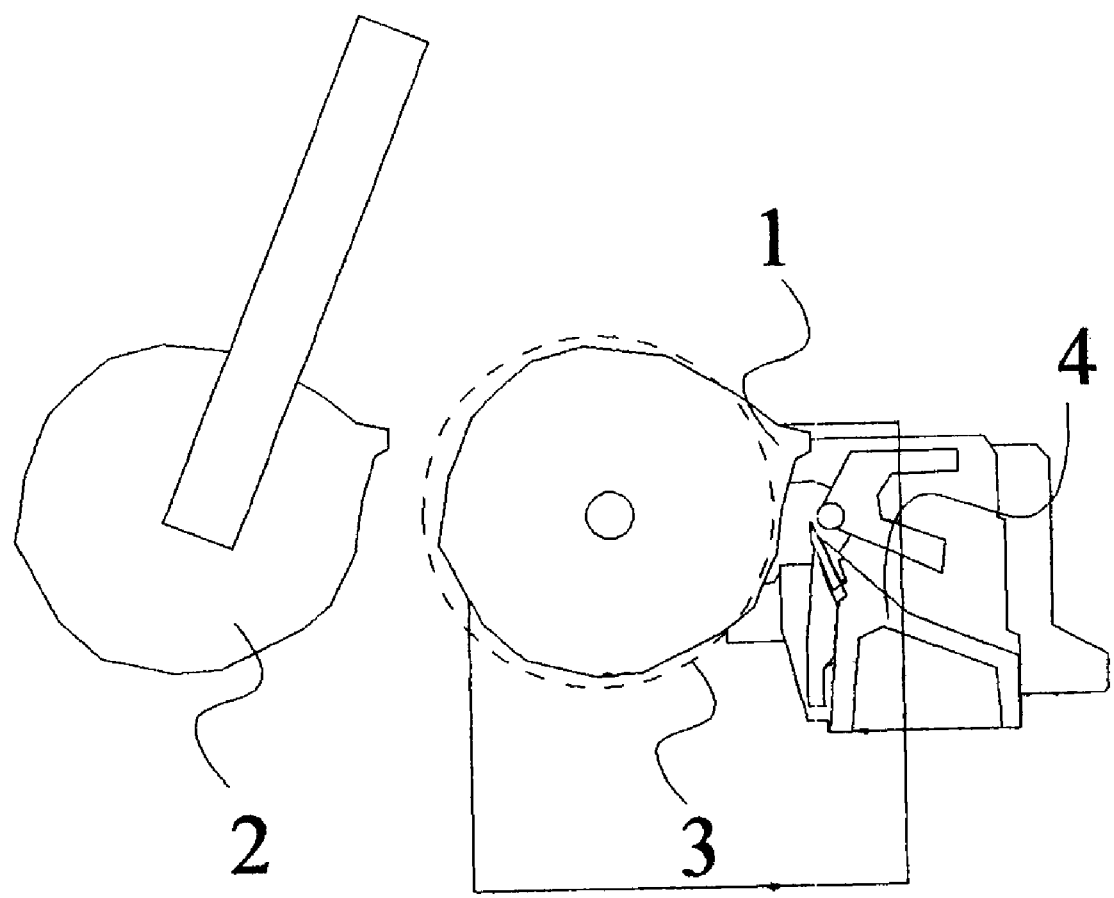

METHOD FOR DETERMINING THE POINT TO START ROUNDING IN THE TURNING OF VENEER

The present invention relates to a method for determining the point to start the rounding phase when turning veneer from a log. The rounding phase is the initial point of veneer turning, wherein irregularities are removed and the log is rounded for the actual veneer cutting, in other words, the initial phase of turning during which the peeling knife does not yet meet the entire surface of the log, whereby the veneer sheet thus turned is fall of splits.

A preliminary phase in veneer turning is the centering of the log, wherein the optimum positions at the log ends for the insertion of the lathe spindles are defined based on the diameter and shape of the log so that the log when turned about the spindle insertion points gives a maximum yield of veneer. In this centering phase, also the maximum diameter of the log is determined and the thus obtained information is used in setting the knife carriage in the initial phase of turning.

When a new log to be turned is being mounted on the lathe, the knife carriage is withdrawn into the rear starting position of the radial feed movement, that is, into a home position, wherein the knife will at all times permit free rotation of the log mounted on the spindles. When the turning phase starts, the knife carriage is driven at a fast rate in the cutting direction into a position determined from the log maximum diameter information obtained from the centering phase. From this position onward, the knife carriage is driven forward at a feed rate defined for the log rounding phase until the log is rounded.

This procedure has been problematic in conjunction with bumpy logs that may have a stub of a thick branch, for instance. However, conventional centering methods and apparatuses are incapable of coping with such projecting bumps, whereupon the set value of knife feed rounds the log at the bump at a fast-feed rate. As a result, the apparatus is subjected to excessive stresses and the log will split due to the unduly fast knife feed rate.

These problems can be rectified by virtue of the method according to the invention, wherein the starting point of log rounding turning is determined, as is characteristic to the invention, by monitoring the intensity of the knife carriage vibration during the initial turning phase occurring at a fast feed rate and then using the thus obtained intensity value of the knife carriage vibration for the determination of the initial position of the log rounding phase.

It is known in the art to measure the intensity value of knife carriage vibration, whereby the thus obtained measurement result is used for controlling the inclination of the knife carriage relative to the log being turned. Such an embodiment is described, e.g., in FI Pat. No. 94,608. Obviously, an equivalent equipment is also applicable in the implementation of the present invention.

In the following, the invention will be examined in greater detail by making reference to the attached drawing illustrating the centering phase of turning and the subsequent turning phase in schematic manner.

A log 2 entering the turning phase is first placed in a conventional centering apparatus, wherein the diameter dimensions and shape of the log are determined and, based on these data, the optimum positions for the insertion of spindles at the log ends are determined. Next, the log is moved onto a lathe having its knife carriage 4 withdrawn into its rearmost position, that is, into the home position in the knife feed direction. The spindles are mounted on the log ends according to the information obtained from the centering measurement. When now the operation would follow the prior-art technique, the knife carriage 4 would be driven from its home position during the initial phase of turning at a fast feed rate toward the log so that the knife feed rate would be changed from the fast feed rate to the rounding feed rate at a maximum diameter 3 obtained from the log centering apparatus. Such an approach, however, neglects a bump 1 on the log, since the bump may have such a short dimension along the axial length of the log that it may remain undetected by the centering apparatus. Consequently, the knife meets the bump 1 at a fast feed rate, which imposes high stresses on the lathe and causes unnecessary splitting of the log surface.

In the method according to the invention, the intensity of the knife carriage vibration is monitored during the fast feed phase, whereby the bump 1 will cause a strong crest in the vibration signal. This information is submitted to the feed rate control system of the knife carriage as a command to slow down the feed rate to the value used for rounding the log, thus overcoming the above-described prior-art problems.

In the control of the fast feed rate, it is advantageous to additionally utilize the maximum log diameter information obtained from the log centering apparatus. Should the knife carriage vibration measurement system fail to detect a sufficiently high increase in the vibration intensity signal before the fast feed rate has proceeded to the maximum log diameter, the fast feed rate must be discontinued from this point onward and the feed rate dropped to the rounding feed rate value. Obviously, the vibration intensity is advantageously compared with a given threshold value that must be exceeded before the feed rate controller is allowed to change the feed rate, thus preventing small stub branches, for instance, from triggering a change in the feed rate.

What is claimed is:

1. A method for determining the point to start the rounding phase in turning veneer from a log where the knife carriage of the lathe is withdrawn into a home position before starting the turning of a new log and, during the initial phase of turning, the knife carriage is driven from the home position to start the rounding phase of the turning comprising monitoring the intensity of the knife carriage vibration during the initial phase when the feed occurs at a fast rate and using the obtained intensity value of knife carriage vibration in the determination of the initiating position for the log rounding phase.

2. The method according to claim 1, wherein the starting position of the rounding turning is determined on the basis of information obtained from a preceding centering phase and the rounding phase is commenced latest after the knife carriage has proceeded into the log maximum diameter position obtained from the centering information.

3. A method of determining a point to start rounding in the turning of veneer comprising:

placing a log on a lathe with the knife carriage withdrawn into the home position;

turning the log and monitoring the intensity of the knife carriage vibration during the initial turning when the knife feed occurs at a fast feed rate;

determining the starting position of the log rounding phase when the monitored vibration intensity is above a threshold level;

driving the knife carriage into the starting position on the log for the rounding phase at a rounding feed rate.

4. The method of claim 3, wherein the starting position is determined on the basis of information obtained from a preceding centering phase and the rounding phase is started after the knife carriage has proceeded into the log maximum diameter position obtained from the centering information.

5. A method of rounding a veneer log comprising:

placing a log on a lathe;

initially turning the log;

moving the knife carriage towards the log at a fast feed rate and monitoring the intensity of the knife carriage;

changing the knife feed rate to a rounding feed rate if the monitored intensity is above a threshold level;

changing the knife feed rate to a rounding feed rate before the knife has proceeded to the maximum log diameter if the monitored intensity is not above a threshold value.

6. The method of claim 5, further comprising driving the knife carriage into the starting position on the log for the rounding phase.

* * * * *